July 5, 1960 K. W. THALHAMMER 2,943,548
PANORAMIC CAMERA
Filed Dec. 23, 1957 4 Sheets-Sheet 1
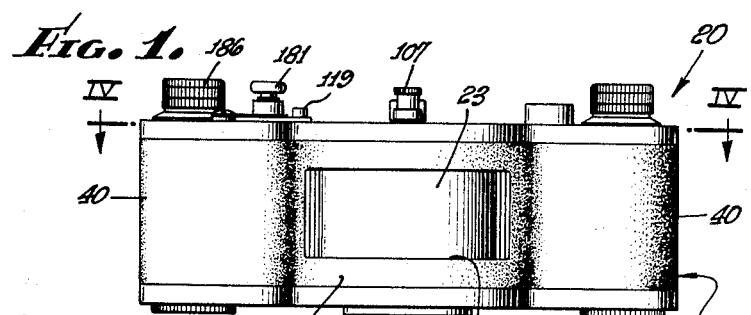
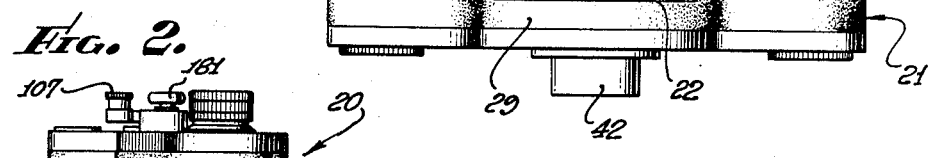
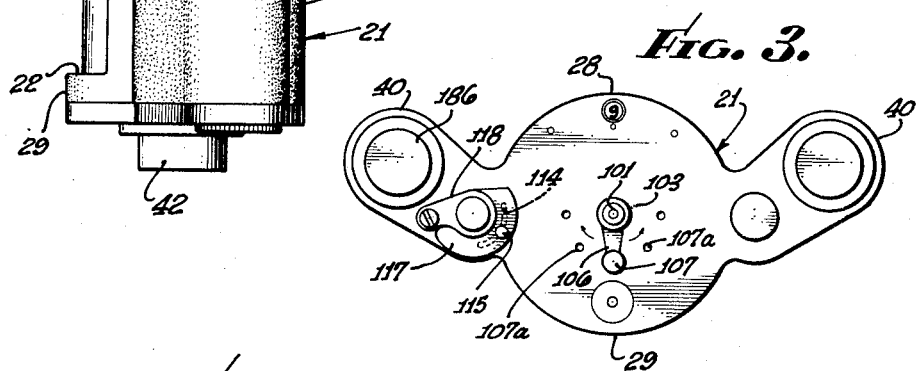
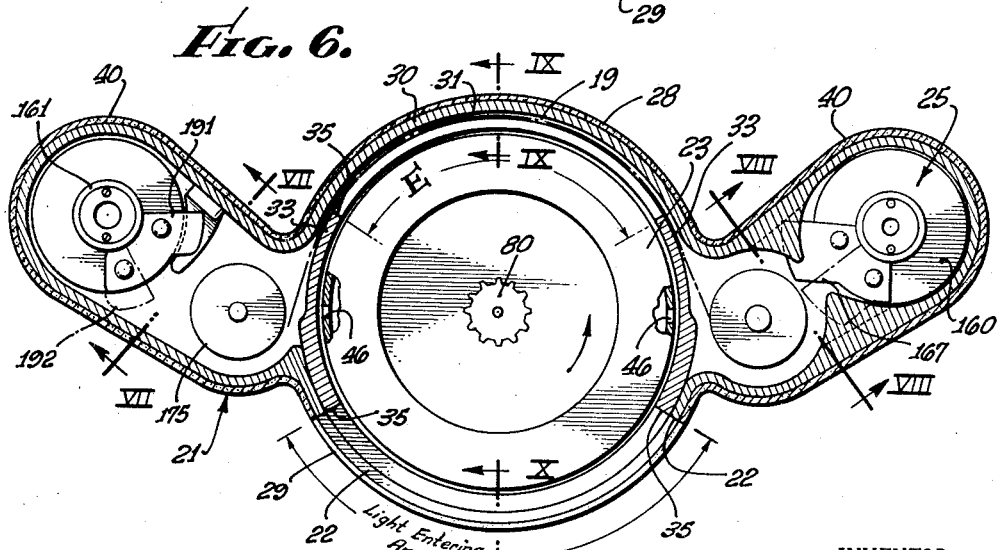
INVENTOR.
KARL WOLFGANG THALHAMMER
BY
ATTORNEY.

July 5, 1960     K. W. THALHAMMER     2,943,548
PANORAMIC CAMERA
Filed Dec. 23, 1957     4 Sheets-Sheet 2
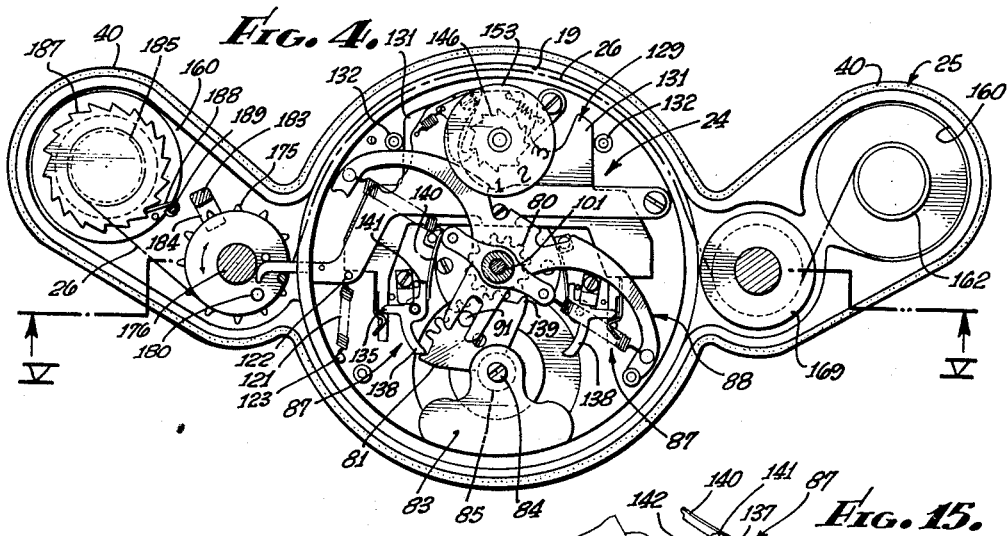
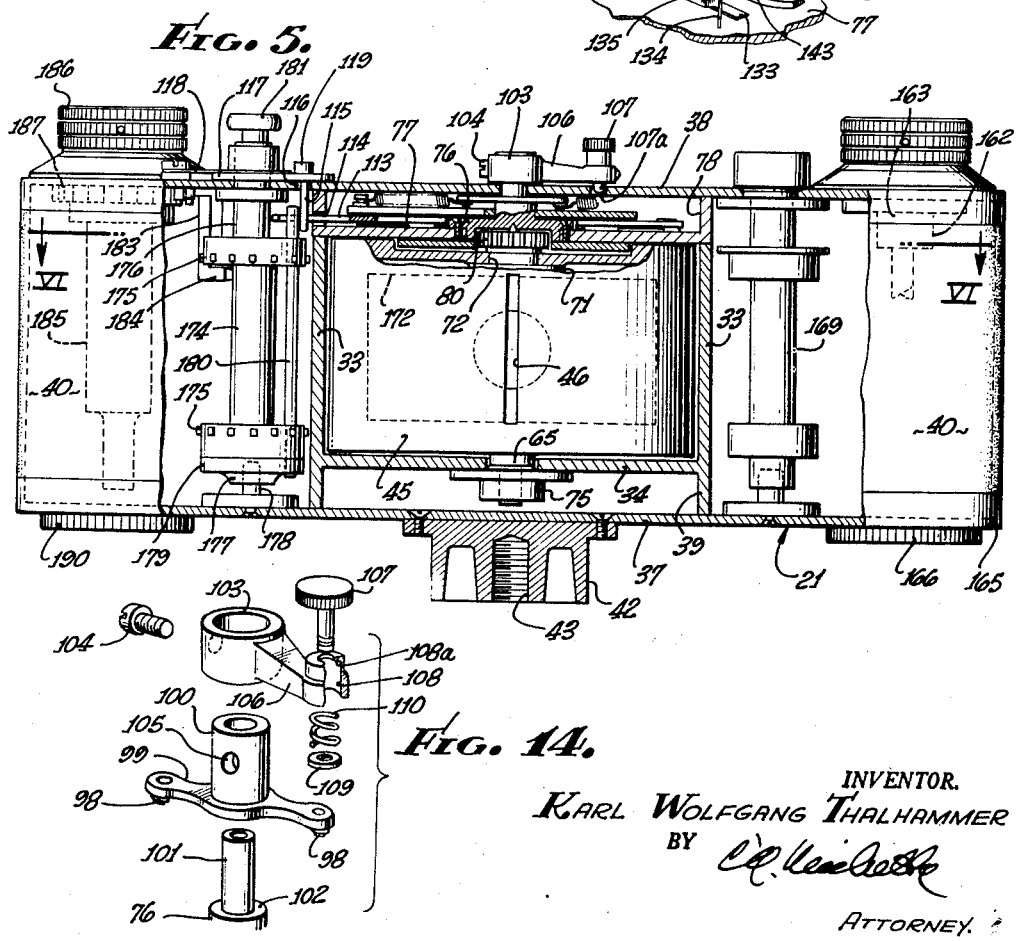
INVENTOR.
KARL WOLFGANG THALHAMMER
BY
ATTORNEY.

July 5, 1960 K. W. THALHAMMER 2,943,548
PANORAMIC CAMERA
Filed Dec. 23, 1957 4 Sheets-Sheet 3
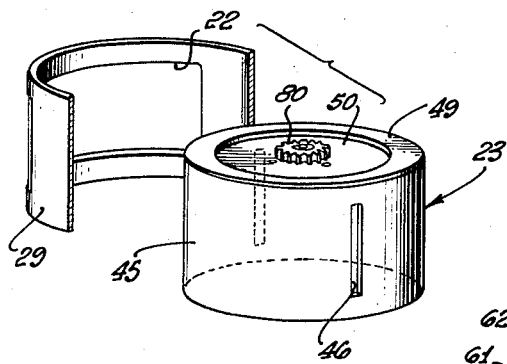
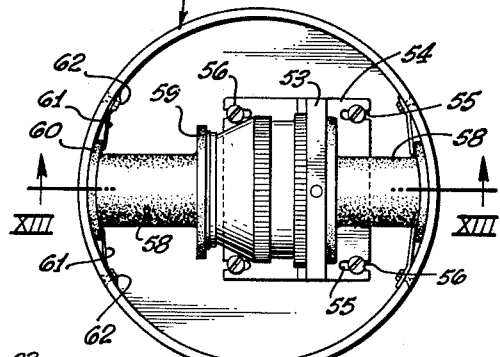
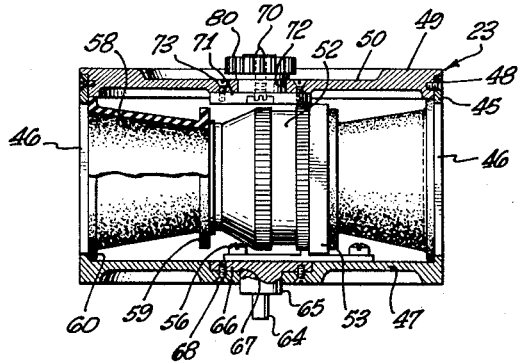
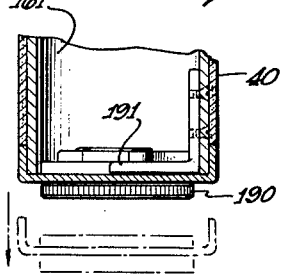
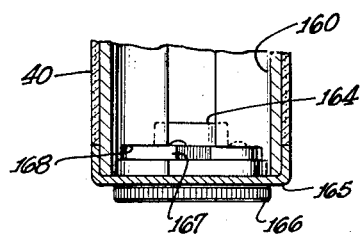
INVENTOR.
KARL WOLFGANG THALHAMMER
BY
ATTORNEY.

July 5, 1960    K. W. THALHAMMER    2,943,548
PANORAMIC CAMERA
Filed Dec. 23, 1957    4 Sheets-Sheet 4
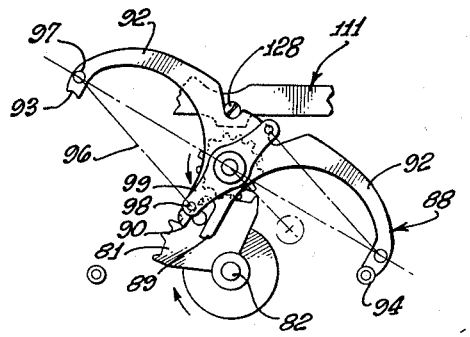
FIG. 16.
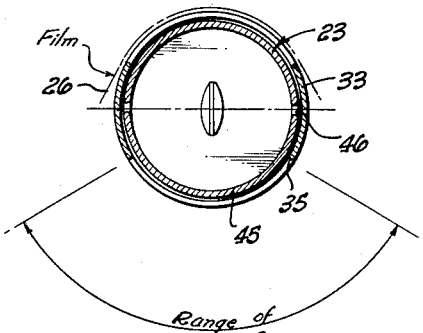
FIG. 18.
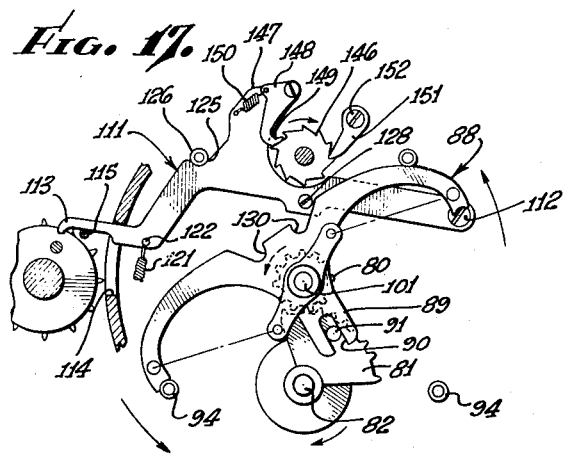
FIG. 17.
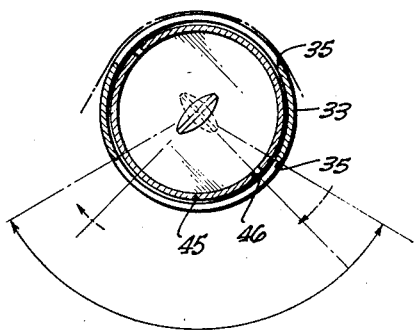
FIG. 9.    FIG. 10.    FIG. 19.
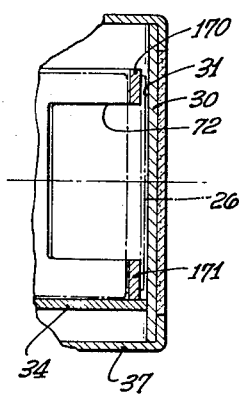
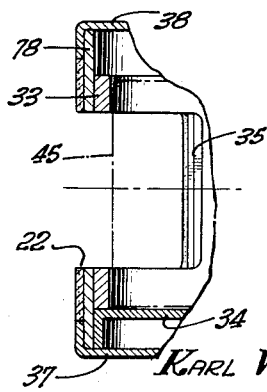
INVENTOR.
KARL WOLFGANG THALHAMMER
BY
ATTORNEY.

United States Patent Office 2,943,548
Patented July 5, 1960

2,943,548

PANORAMIC CAMERA

Karl Wolfgang Thalhammer, 10219 Eldora Ave., Sunland, Calif.

Filed Dec. 23, 1957, Ser. No. 704,807

5 Claims. (Cl. 95—16)

This invention relates to a photographic camera and more particularly to a novel camera for taking panoramic pictures.

Prior proposed panoramic cameras have included a camera housing provided with an oscillatable shutter means mounted adjacent to and in an opening in the front wall of the camera. The shutter and lens were oscillatable about an axis spaced close to the front wall of the camera and usually included a light-confining tube of opaque material which was swingingly connected to an enlarged front opening in the camera housing by a flexible material. The shutter and lens means were oscillated from one side of the enlarged opening to the other side thereof by a tensioned spring. Such prior proposed panoramic cameras were not satisfactory because the light-obstructing material including the housing and the rotatable shutter means soon developed cracks and openings which would admit light to the interior of the camera. Furthermore, such flexible means included numerous crevices and corners which collected dirt and other foreign matter. Lateral edges of film exposed by such oscillatable shutter means were often blurred and fuzzy, and exposure of a film in such prior cameras was often nonuniform.

It is the primary object of this invention to design and provide a panoramic camera which employs a novel construction which obviates the disadvantages of prior panoramic cameras.

Another object of this invention is to disclose and provide a panoramic camera wherein a camera housing is provided with a generally cylindrical central housing portion for oscillatably mounting a cylindrical lens mounting casing and shutter coaxially nested therewithin.

Another object of this invention is to disclose and provide a panoramic camera wherein the lens mounting means is rotatable about an axis positioned midway between a film to be exposed and a light-admitting aperture in the camera housing.

A further object of this invention is to provide a panoramic camera wherein the camera housing is provided with a cylindrical central housing portion, a lens mounting means is nested within said cylindrical central portion for oscillation therein and wherein means are carried by the housing to adjust the rate of oscillation of the lens mounting means.

A still further object of this invention is to disclose and provide a novel camera construction for uniformly exposing a film strip having a section arranged coaxial with the axis of rotation of a lens means.

This invention contemplates a novel panoramic camera wherein a nested cylindrical casing which carries a lens means is oscillated at a uniform rate and wherein means are carried by a camera housing for recording the number of exposures made.

Generally speaking, this invention contemplates a camera housing provided with a cylindrical central housing portion and swept back wing portions on opposite sides thereof for carrying film spools. The front wall of the cylindrical portion is provided with a transversely elongated, light-admitting opening. Within the central portion is pivotally mounted for oscillatable movement a cylindrical lens mounting casing closely nested in the central portion and provided with diametrically opposite light-transmitting slots, said light-transmitting slots being normally positioned within the central portion spaced from said light-admitting opening. A lens means is carried by the casing with its optical axis aligned with the slots. On the housing may be carried spring means for oscillating the cylindrical casing and lens therein for causing one of said slots to traverse the light-admitting opening in the housing. Release means for said spring means to cause the cylindrical casing to oscillate may be carried by the housing in association with a guide reel for the film and in such a manner that the guide reel cooperates with the release means for determining the amount of film to be advanced in order to position an unexposed film portion in the housing for a successive exposure. Means are also provided on the housing in association with the release means for counting and recording the number of exposures made.

Many other objects and advantages of this invention will be readily apparent from the following description of the drawings.

In the drawings:

Fig. 1 is a front view of a camera embodying this invention.

Fig. 2 is an end view of Fig. 1.

Fig. 3 is a top view of Fig. 1.

Fig. 4 is a plan view taken in the plane indicated by line IV—IV of Fig. 1 which lies just below the top wall of the camera housing.

Fig. 5 is an enlarged transverse sectional view taken in the planes indicated by line V—V of Fig. 4.

Fig. 6 is a sectional view taken in the plane indicated by line VI—VI of Fig. 5.

Fig. 7 is a fragmentary sectional view taken in the plane indicated by line VII—VII of Fig. 6.

Fig. 8 is a fragmentary sectional view taken in the plane indicated by line VIII—VIII of Fig. 6.

Fig. 9 is a fragmentary sectional view taken in the plane indicated by line IX—IX of Fig. 6.

Fig. 10 is a sectional view through the front wall of the camera taken in the plane indicated by line X—X of Fig. 6.

Fig. 11 is a fragmentary perspective exploded view of the lens mounting means and a fragmentary portion of the front wall of the housing.

Fig. 12 is a view of the lens mounting means carried in the cylindrical casing with the top of the casing removed.

Fig. 13 is a sectional view taken in the plane indicated by line XIII—XIII of Fig. 12.

Fig. 14 is an exploded perspective view of a crank means for tensioning spring means for oscillating the lens mounting means.

Fig. 15 is a fragmentary perspective view of a releasable catch means.

Fig. 16 is a partial top view of the means for rotating the cylindrical casing, said view illustrating loading of spring means for a selected speed of oscillation.

Fig.17 is a view similar to Fig. 16 illustrating the position of the various parts of the shutter control means in released position for permitting rotation of the cylindrical casing.

Fig. 18 is a diagrammatic view showing the normal position of the lens and the angle of view of the camera.

Fig. 19 is a diagrammatic view showing the lens in taking position.

A panoramic camera embodying this invention is generally indicated at 20. In general, camera 20 includes a camera housing 21 provided with a transverse, elongated, rectangular, light-admitting opening 22 disposed centrally of the camera. Within the housing and directly behind the light-admitting opening 22 is provided an oscillatable lens carrying or mounting means 23 which is adapted to be reciprocally oscillated through approximately 180°. Means for oscillating the lens mounting means 23 is indicated at 24 (Fig. 4), the exemplary means being adjustably spring-tensioned for causing oscillation of the mounting means 23 at a preselected speed. The camera housing 21 is provided with film reel or spool carrying means 25 at opposite sides of the lens mounting means 23. The housing is also provided with a curved passageway generally indicated at 19 for guiding a film strip 26 in a curved path opposite to the opening 22 and coaxial to lens mounting means 23.

The camera housing 21 in detail comprises a central substantially cylindrical portion 28 having a curved front wall 29 provided with the transversely extending opening 22. As shown in Fig. 6, the light-admitting opening subtends an angle of more than 90° and thereby provides an extremely wide aperture for admitting light from a wide angle of field. In diametric opposition to opening 22 and formed about the same axis as the front wall is provided a back wall 30, said back wall providing a partially cylindrical internal surface 31 against which film strip 25 may slide and be guided. Within the central housing portion 28 may be provided transversely diametrically opposed upstanding wall sections 33 (Fig. 5), said sections 33 being connected by a bottom circular wall 34. Edges 35 of wall sections 33 define transverse openings within the housing for transmission of light therethrough so that the angle subtended by the light-admitting opening and the angle subtended by the rearwardly directed edges 35 of sections 33 will be virtually the same so as to provide an exposure area on a film strip 25 of virtually the same curved length as opening 22.

The camera housing 21 also includes a bottom wall 37 and a top wall 38 of approximately the same shape and configuration, said top and bottom walls extending over and completely covering the central housing portion 28. It will be noted that the wall 34 connecting the sections 33 within the housing may be spaced from the bottom wall 37 by depending extensions 39 of the sections 33.

Integrally formed with the central housing portion 28 may be swept back wing housing portions 40 arranged at opposite sides thereof. Each wing portion 40 is provided with means for removably mounting a film reel or spool therewithin as later described. It may be noted that the swept back arrangement of the wing portions 40 provides for a maximum width of opening 22 for admitting light into the central housing portion. The top and bottom walls 38 and 37 are configured to the plan of the housing and wing portions so as to correspond to said wing portions.

A tripod mounting means 42 may be carried by the bottom wall 37 in coaxial alignment with the cylindrical portion 28. The tripod mounting means may be of any well known form and as illustrated includes a threaded bore 43 for threadedly receiving a mating part on an associated tripod. The tripod mounting means may be suitably secured as by screws to the bottom wall 37.

Oscillatable lens mounting means 23 are shown in detail in Figs. 11–13 inclusive. The lens mounting means 23 may comprise a cylindrical drum or casing including a substantially imperforate wall except for the provisions of diametrically opposed, elongated, rectangular, light-transmitting slot 46, said slots extending parallel to the axis of the cylindrical casing. The cylindrical wall 45 may be formed integral with a circular bottom wall 47. The top circumferential margins of cylindrical wall 45 may be received as at 48 within a rabbeted circumferential edge of a circular top wall 49. The top wall 49 may be provided with a circular coaxial recess 50.

Mounted within cylindrical casing may be any suitably selected lens means 52 positioned and held by means of a circular strap 53 connected to a generally rectangular base plate 54. The base plate 54 may be adjustably mounted on bottom wall 47 by open-ended, elongated slots 55 at opposite ends adjustably receiving mounting screws 56.

Means for confining light transmitted through the slots 46 to and from the lens 52 may comprise, at each end of the lens 52, a light-confining opaque tube 58 of any suitable shape. Each tube 58 is non-light-reflecting and may be provided with an inner circular flange 59 for connection to the associated end of the lens 52 in a manner to prevent transmission of light. The outer end of each tube 58 may be provided with an arcuate flange 60 which seats against the internal surfaces of wall 45 at the peripheral margins of the associated slot 46. The flange 60 is held in tight seating engagement against the internal surfaces of wall 45 by a pair of spring means 61 secured to wall 45 by suitable screw bolts 62 and having free end portions bearing against the flange 60 and urging the flange 60 into tight seating engagement with the wall 45. It will thus be readily apparent that light entering one of the slots 46 is trasmitted to the lens, through the lens, and out of the oppositely disposed slot 46.

The lens 52 may be any suitable selected lens having a preselected focal length and aperture so as to produce an image on film strip 26 during exposure thereof.

Means for mounting the cylindrical casing of the lens mounting means 23 for oscillation within the central housing portion 28 may comprise a pin 64 depending from bottom wall 47 of the cylindrical casing and in coaxial alignment therewith. The pin 64 may be integrally formed with an enlarged shank portion 65 which extends through an axial port provided in the bottom wall 47. Shank portion 65 is formed with a circular flange 66 receivable within a circular recess 67 formed in the bottom wall 47 and secured as by screws 68. The top wall 49 carries a top pivot pin 70 which may be carried by a flanged insert member 71 which extends through the axial port 72 in top wall 49 and which may be secured as by screws 73. The top and bottom pins 64 and 70 are received respectively in bearing means 75 and 76 carried by the wall 34 and a partition wall 77 carried by sections 33 below and in spaced relation to top wall 38. The partition wall 77 is provided with an upstanding circumferential flange 78 which extends between the top edge of sections 33 and the opposed internal surfaces of the top wall 38.

Means to oscillate the lens mounting means 23 may comprise a pinion gear 80 (Figs. 4, 5, 16 and 17) carried by the insert member 71 above the top wall 49 of the lens mounting means 23 and partially within the circular depression 50. Adjacent to the pinion gear 80 and in meshed engagement therewith may be provided a segment gear 81 pivoted for limited angular movement about an axis 82 spaced forwardly of the pinion gear 80. The segment gear 81 may be pivotally mounted as by a suitable plate 83 secured to the partition wall 77 and provided with a screw pivot pin 84 extending into the hub 85 of the segment gear 81.

The segment gear 81 is limitedly oscillatable between a pair of spaced releasable catch means 87 by a spring-powered rotatable yoke-like member 88. The yoke-like member 88 is pivotally mounted about the axis of the pinion gear and includes a central bifurcated portion 89 defining a slot 90 for relative pivotal and sliding engagement with a pin 91 carried by the segment gear 81 at the midpoint of the arc subtended by the extremities of the segment gear. The yoke-like member 88 also includes oppositely extending, forwardly curved side arms 92 which may be provided with concave end faces 93 for abutment against cylindrical stop elements 94 carried in selected spaced relation on partition wall 77. The stop elements 94 limit oscillatable movement of the yoke-like member 88.

The yoke-like member is caused to rotate by means of a pair of adjustably tensioned springs 96, said springs 96 including suitable coil springs of selected strength. Each coil spring 96 is connected at one end as at 97 to a side arm 92 adjacent its edge extremity 93 and at its other end as at 98 to one end of a crank arm 99. The crank arm 99 is centrally pivotally mounted for rotation about the axis of the pinion gear and may be carried at the bottom end of a tubular sleeve 100 (Fig. 14) which is sleeved over an upstanding shaft 101 connected to the bearing means 76, said bearing means 76 and shaft 101 defining an annular shoulder 102 upon which the bottom central annular face of the crank arm may seat.

Over the tube 100 may be sleeved a collar 103 secured against rotation thereto by a set screw 104 which extends through the collar and into a threaded bore 105 on the tube 100. The collar 103 carries an arm 106 which supports at its outer end a downwardly biased headed detent pin 107. The pin 107 is received within a hub 108 and is provided with a lock ring 109, said lock ring 109 providing a seat for a biasing spring 110 which, at its other end, seats against an annular shoulder 108a in the hub 108. The detent pin 107 extends below the arm 106 in normally biased position to selectively engage circularly spaced ports 107a provided in top wall 38 for adjustably tensioning spring means 96 so as to control the rate of angular rotation of the lens mounting means. It will be readily apparent that this manner of rotating the lens mounting means through a segment gear pivotally and slidably connected and driven by a yoke-like member provides a uniform rate of oscillation through the angular distance which the lens mounting means rotates.

Means to hold the oscillatable means under spring tension and to release said oscillatable means to cause rotation of the lens mounting means 23 may include a releasable latch member 111 (Figs. 4, 16 and 17) pivoted at 112 at one end to the partition wall 77. The opposite end of latch member 111 includes a latch end portion 113 extending through a transversely disposed curved opening 114 in upstanding wall 78 for engagement with a release pin 115. The release pin 115 depends downwardly through a slot 116 in the top wall 38 of the camera and is carried by a partially circular plate 117 pivoted on shaft 176. A biased covering plate 118 extends over and secures plate 117 tightly against wall 38. The pin 115 may be headed at 119 to facilitate grasping and actuation thereof in a transverse rearwardly directed movement.

Latch member 111 may be of any suitable shape and configuration. The latch member 111 may be biased forwardly by a spring 121 connected at 122 to the latch member inwardly of latch portion 113 and connected to the partition wall 77 at 123. The latch member may also be provided with a shoulder 125 intermediate its ends for contact with a stop element 126 carried by partition wall 77 to limit movement of the latch member 111 in release thereof.

The latch member 111 is also provided with a positioning screw 128 centrally thereof, said positioning screw also engaging a slidable release plate 129 lying immediately below the latch member 111. The positioning screw 128 cooperates with a pair of spaced detents 130 in yoke member 88, said detents 130 being spaced and disposed so that the positioning screw 128 is engaged therein at extreme positions of the yoke member 88 and the segment gear 81.

The slidable release plate 129 includes rearwardly extending spaced portions 131 which may be guided between guide buttons 132 carried by the partition wall 77 for lateral, rearward and forward movements. At the front of slidable plate 129 may be provided forwardly extending arms 133 (Fig. 15) which cooperate with the releasable catch means 87. Each arm 133 may be provided with an upstanding, forwardly extending, spring-biased, suitably bent element 134 for engagement with a release finger 135 carried by a dog 136 pivoted at 137 to partition wall 77. The dog 136 includes a segment gear engaging finger 138 which extends forwardly to releasably contact an end tooth 139 on the segment gear 81. The dog 136 may be biased into segment gear engaging position by a leaf spring 140 which bears against a biasing finger 141 on the dog. The spring 140 may be secured in any suitable manner to the partition wall 77. A pair of spaced stop pins 142 are provided for respective engagement with the finger 141 and the release finger 135 to control the limit positions of the dog 136. A suitable clip 143 may hold the dog 136 in assembly with its pivot pin 137.

In the position of the oscillatable means shown in Fig. 4 it will be seen that the segment gear 81 is held against rotation by the engaging finger 138 of the release means 87 and that the finger 135 of the dog 136 prevents disengagement of the finger 138 with the gear by its contact with the spring 134 carried by arm 133 of the slidable plate 129. When the spring is tensioned by turning the crank 106 to a selected position, the oscillatable means is in condition for release to rotate the lens mounting means. When the release pin 115 is moved transversely rearwardly, the pin 115 causes the latch member 111 to pivot rearwardly about its pivot point 112. As the positioning screw 128 is moved rearwardly, the slidable plate 129 also moves laterally and rearwardly. The positioning pin 128 disengages with its detent 130 and at the same time the release finger 135 disengages the catch 134. The segment gear is thus released simultaneously with the yoke-like member 88 so that the tensioned springs 96 may cause rotation of the member 88, the segment gear 81 and the spur gear 80. Since the spur gear is fixed to the lens mounting means, the lens means is caused to rotate through approximately 180°.

Means for counting the number of pictures exposed may include a ratchet wheel 146 (Fig. 17) pivotally carried on the partition wall 77. The latch member 111 may be provided with a rearwardly extending portion 147 which may carry a pivoted ratchet turning finger 148 having an end 149 contacting the teeth of the ratchet 146. A spring 150 biases the ratchet turning finger into engaging position. A pawl 151 may be pivoted at 152 to the partition wall 77 and engages the ratchet teeth of the wheel 146 to prevent unwanted rotation thereof. It will be apparent that as each picture is exposed by actuation of the release means 115, the ratchet wheel 146 will be caused to partially rotate by interengagement of the finger 148 therewith. The shaft carrying the ratchet wheel 146 may also carry a disc 153 on top of the camera which may carry indicia consecutively the number of pictures exposed.

Means for mounting a film strip in the camera to position the film strip consecutively in picture-taking relation may include film reel holding chambers 160 and 161 in the swept back wing portions 40 of the camera housing. In chamber 160 may be positioned a film reel containing supply of film to be exposed. The supply reel may be mounted therein in any convenient manner and as indicated may include a film spool 162 rotatably mounted at its upper end in a mounting means generally indicated at 163. The lower end of the film spool 162 may be mounted on a suitable pivotal mounting indicated at 164. The film spool may be inserted into chamber 160 by removing a bottom cover 165 to the chamber by rotating a knob 166 which carries a latch 167 rotatably positionable over a slot 168 carried by the end portion 40.

The film strip 26 carried by a film reel may be guided over an intermediate guide idle spool 169 pivotally mounted in end portion 40 of the housing between the central housing portion 28 and chamber 160. The idle spool 169 serves to vertically position the film strip as it enters the central portion of the housing and to cause the strip to enter the housing along a path tangential to the cylindrical portion thereof. The film strip extends through a partially cylindrical passageway 31 defined by the back wall 30 of the housing portion 28 and by upstanding and depending opposed concentrically curved wall portions 170 and 171, said wall portions 170 and 171 defining therebetween a rearwardly directed opening 172.

The film strip 26 tangentially passes out of said passageway 31 for engagement with a rotatable guide spool 174. The guide spool 174 is provided at opposite ends with sprocket teeth 175 to intermesh with openings in opposite edge margins of film strip 26. The spool 174 is rotatably mounted on an axially slidable shaft 176 which extends therethrough for pivotal mounting as at 177 on an upstanding pin 178 carried by the bottom wall 37 of the housing. The pivotal mounting 177 includes a circular spool seat 179 which is slidable axially on pin 178 and which carries an upstanding off center pin 180 which slidably extends through opposite end portions of spool 174. The pin 180 projects upwardly above the latch finger portion 113 for cooperative contact therewith as later described. The shaft 176 extends above the top wall of the housing and may terminate in a knurled knob 181.

The housing end portion may carry a depending bracket 183 having an inturned shoulder 184 which extends beneath the upper end portion of the spool 174 to limit downward movement of spool 174 when the shaft 176 is urged downwardly to permit the top of pin 180 to pass beneath latch finger portion 113. The circumference of the sprockets on the spool 174 may be slightly greater than the length of the circular path defined by the rear edges 35 of the wall segments 33 which defines the exposure area of the film. In picture-taking position the pin 180 is positioned virtually as shown in Fig. 4 wherein it lies forwardly of the latch portion 113. After the picture has been taken the film is wound by turning the spool 185 which is connected to a knurled cap 186. As the film is wound on spool 185, spool 174 is turned because of the sprocket engagement with the film and the pin 180 is rotated to a position behind the latch portion 113. When the pin 180 reaches this position the winding must stop because of contact with the latch portion and an unexposed portion of the film has been properly positioned for exposure. Before the release means 119 can be actuated to expose a new picture the pin 180 must be depressed below the latch portion and moved to a position forwardly to the latch portion. This is accomplished by depressing the knob 181 and simultaneously turning the cap 186. The camera is then ready to expose another picture and the latch member 111 is free to be pivoted to release the oscillating means.

The film may be wound on any suitable take-up reel mounted on the reel 185. Reel 185 carries at its top a ratchet wheel 187 having teeth which may be engaged by a spring pawl 188 carried by a pin 189 just beneath the top wall 38. The pawl 188 prevents reverse rotation of the reel 185. The take-up reel upon which the film is wound may be readily removed from chamber 161 by turning the lower cap 190 to move locking member 191 into unlocking position as at 192 wherein the bottom cap 190 may be removed and the reel withdrawn from chamber 61.

In operation of the panoramic camera of this invention it is understood that suitable film is properly positioned in the camera with an unexposed portion opposite the exposure area indicated at E (Fig. 6). The springs 96 may be selectively tensioned by grasping the handle means 106 and rotating the handle for positioning in a selected detent 114 in the top wall. Rotation of the handle causes rotation of the crank arm which places the springs under tension. Upon movement of the release pin 115 rearwardly, the latch member 111 is moved rearwardly about its pivot point 112 to release the positioning button 128 from engagement with the yoke-like member 88, to slide rearwardly the slidable plate 131, to release the segment gear 81, and to thereby permit the springs to rotate the yoke member and the segment gear so as to cause rotation of the spur gear 80 and cause rotation of the lens mounting means. As the lens mounting means is rotated the light-transmitting slots 46 sweep across the light-admitting opening 22 in the housing and simultaneously the diametrically opposite light-transmitting slot 46 exposes a portion of the film strip 25. Thus, the lens mounting means is swung through approximately 180° from non-light-admitting positions as shown in Figs. 6 and 18 to and through light-admitting positions having a range greater than 90°.

After the picture is taken the film strip may be wound as described above in order to position an unexposed portion of the film strip in picture-taking position.

It will thus be readily apparent to those skilled in the art that a panoramic camera has been provided which is capable of scanning an extremely wide angle and wherein the film strip is positioned for exposure in a curved path which is coaxial with the axis of rotation of the lens. Thus, exposure of the film is virtually uniform throughout the entire wide angle of view of the lens through the light-admitting aperture 22.

While the means for oscillating the lens mounting means, the means for controlling the length of film displaced in the camera, and the means for counting the number of pictures taken have been described in great detail, it is understood that various other means may be employed in order to accomplish these functions. It is important to note that the camera housing is provided with a cylindrical central housing portion in which is concentrically and coaxially mounted a lens mounting casing which carries the lens means. There is thus provided a structure which is readily controllable and which does not admit unwanted light.

It is understood that various modifications and changes may be made in the construction of the camera described above which come within the spirit of this invention and all such modifications and changes coming within the scope of the appended claims are embraced thereby.

I claim:

1. In a panoramic camera, the combination of: a camera housing including a cylindrical wall means provided with a curvilinear light-admitting opening and a diametrically oppositely disposed curvilinear film path means; a cylindrical lens mounting casing coaxially mounted within said housing portion for oscillatable rotation therein, said casing being provided with diametrically opposed light-transmitting slots; and oscillatable means carried by the camera housing for reciprocating the lens casing between light-admitting and non-light-admitting positions, said oscillatable means including a spur gear coaxially mounted on the lens casing; a segment gear pivoted on the housing, a yoke-like member provided with spaced arms and pivotally and slidably connected to the segment gear and pivoted for rotation about the axis of said spur gear; a crank means mounted for rotation about said axis; spring means connecting said crank means and the arms of said yoke-like member; a releasable latch member pivoted at one end to the housing, having a positioning element releasably and selectively engaging the yoke member, and having a latch portion; and a release pin engageable with said latch portion.

2. In a panoramic camera, the combination of: a camera housing including a cylindrical wall means provided with a curvilinear light-admitting opening and a diametrically oppositely disposed curvilinear film path means; a cylindrical lens mounting casing coaxially mounted within said housing portion for oscillatable rotation therein, said casing being provided with diametrically opposed light-transmitting slots; oscillatable means carried by the camera housing for oscillating the lens casing, said oscillatable means including a spur gear coaxially mounted on the lens casing; a segment gear pivoted on the housing, a yoke-like member provided with spaced arms and cooperatively connected to the segment gear and pivoted for rotation about the axis of said spur gear; a crank means mounted for rotation about said axis; spring means connecting said crank means and the arms of said yoke-like member; a releasable latch member pivoted at one end to the housing, having a positioning element releasably and selectively engaging the yoke member, and having a latch portion; a release pin engageable with said latch portion; and means carried by the housing and engageable with said latch member for counting the number of pictures exposed.

3. In a panoramic camera, the combination of: a camera housing provided with a curvilinear light-admitting opening and an oppositely disposed curvilinear film path means; a cylindrical lens mounting casing mounted within said housing for oscillatable rotation therein about the axis of said curvilinear opening and film path means; oscillatable means carried by the camera housing for reciprocating the lens casing between light-admitting and non-light-admitting positions, said oscillatable means including a spur gear coaxial with the lens casing, a segment gear pivoted on the housing about an axis spaced from the axis of the lens casing and provided with a pin spaced from the gear axis, a yoke-like member provided with spaced arms and having a slot pivotally and slidably engaging said pin, said yoke-like member being pivoted for rotation about the axis of the spur gear; a crank means mounted for rotation about the axis of the spur gear; spring means connecting the crank means and the arms of the yoke-like member; and latch means for releasably positioning said yoke-like member.

4. In a camera as stated in claim 3 including film take-up means, and means to releasably lock the latch means when an unexposed portion of the film is in exposure position on said film path means, said releasable locking means being actuated by said film take-up means.

5. In a panoramic camera, the combination of: a camera housing including a cylindrical central housing portion and swept back end housing portions; film reels and idle film guide sprockets in said end housing portions, said cylindrical housing portion having a curvilinear light-admitting opening and a diametrically opposed coaxial curvilinear film path means; a cylindrical lens casing coaxially mounted within said central housing portion; oscillatable means to rotate said lens casing between light-admitting and non-light-admitting positions, said oscillatable means including a spur gear coaxially mounted on the lens casing; a segment gear pivoted on the housing, a yoke-like member provided with spaced arms and with a pivotal and slidable connection to the segment gear, said yoke-like member being pivoted for rotation about the axis of the spur gear; a biased crank means mounted for rotation about the axis of the spur gear and connected with the arms of the yoke-like member; a releasable latch member pivotally mounted on the cylindrical housing portion and having a positioning element selectively engaging the yoke-like member; and means on one of said idle film guide sprockets for releasable engagement with said latch member to releasably lock the latch member when an unexposed portion of a film strip is in position for exposure.

References Cited in the file of this patent

UNITED STATES PATENTS

| | | |
|---|---|---|
| 694,929 | Houston | Mar. 2, 1902 |
| 1,572,246 | Riddell | Feb. 9, 1926 |
| 2,148,011 | Burke | Feb. 21, 1939 |
| 2,596,746 | Waller | May 13, 1952 |
| 2,782,699 | Vanderhooft | Feb. 26, 1957 |